US007648671B2

(12) United States Patent
Kai et al.

(10) Patent No.: US 7,648,671 B2
(45) Date of Patent: Jan. 19, 2010

(54) METHOD OF MAKING MASTER FOR MANUFACTURING OPTICAL DISC AND METHOD OF MANUFACTURING OPTICAL DISC

(75) Inventors: Shinichi Kai, Tokyo (JP); Akira Kouchiyama, Kanagawa (JP); Katsuhisa Aratani, Chiba (JP); Kenzo Nakagawa, Kanagawa (JP); Yoshihiro Takemoto, Tokyo (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 10/502,038

(22) PCT Filed: Nov. 20, 2003

(86) PCT No.: PCT/JP03/14848

§ 371 (c)(1),
(2), (4) Date: Feb. 3, 2005

(87) PCT Pub. No.: WO2004/047096

PCT Pub. Date: Jun. 3, 2004

(65) Prior Publication Data

US 2005/0128926 A1    Jun. 16, 2005

(30) Foreign Application Priority Data

Nov. 20, 2002 (JP) .............................. 2002-336060

(51) Int. Cl.
*H05B 6/00* (2006.01)
(52) U.S. Cl. ....................................................... 264/482
(58) Field of Classification Search .................. 264/482
See application file for complete search history.

(56) References Cited

U.S. PATENT DOCUMENTS 4,380,015 A    4/1983    Ito et al.

(Continued)

FOREIGN PATENT DOCUMENTS

EP    0626680 A2    11/1994

(Continued)

OTHER PUBLICATIONS

European Search Report in counterpart Application No. 03811546.5-1232 dated Sep. 28, 2007.

(Continued)

*Primary Examiner*—Eric Hug
*Assistant Examiner*—Russell J Kemmerle, III
(74) *Attorney, Agent, or Firm*—Sonnenschein Nath & Rosenthal LLP

(57) ABSTRACT

The method of the present invention includes an exposing step in which a laser beam for recording modulated by an information signal corresponding to an information signal of an information concave and convex pattern formed on the optical disc is applied to an inorganic resist layer 101 formed on a substrate 100 to form an exposed pattern corresponding to the information concave and convex pattern on the optical disc, and a development step in which a concave and convex pattern corresponding to the information concave and convex pattern by the inorganic resist layer is formed. By applying a laser beam for estimation to a predetermined area on the inorganic resist layer in the exposing step to estimate recorded signal characteristics of the exposed pattern by the inorganic resist layer using reflected light of the laser beam for estimation, and controlling power of the laser beam for recording based on the estimated result, the aimed information recording on the optical disc can reliably be obtained.

7 Claims, 12 Drawing Sheets

U.S. PATENT DOCUMENTS

2002/0018439 A1 * 2/2002 Kato et al. ............... 369/275.4

FOREIGN PATENT DOCUMENTS

| | | |
|---|---|---|
| EP | 0772189 A2 | 5/1997 |
| JP | 53-9101 | 1/1978 |
| JP | 53-009101 | 1/1978 |
| JP | 55-17152 | 2/1980 |
| JP | 55017152 | 2/1980 |
| JP | 56-125743 | 10/1981 |
| JP | 56-153488 | 11/1981 |
| JP | 57-203233 | 12/1982 |
| JP | 57203233 | 12/1982 |
| JP | 60-254432 | 12/1985 |
| JP | 03-129349 | 6/1991 |
| JP | 04-356744 | 12/1992 |
| JP | 08-124226 | 5/1996 |
| JP | 08-329534 | 12/1996 |
| JP | 09-152716 | 6/1997 |
| JP | 11-209558 | 8/1999 |
| WO | WO 02-49009 A2 | 6/2002 |

OTHER PUBLICATIONS

Japanese Office Action dated Aug. 26, 2008 for Japanese Application No. 2004-553223.

* cited by examiner

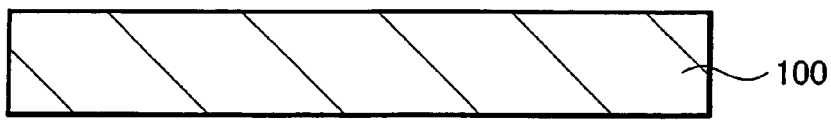
FIG. 1A
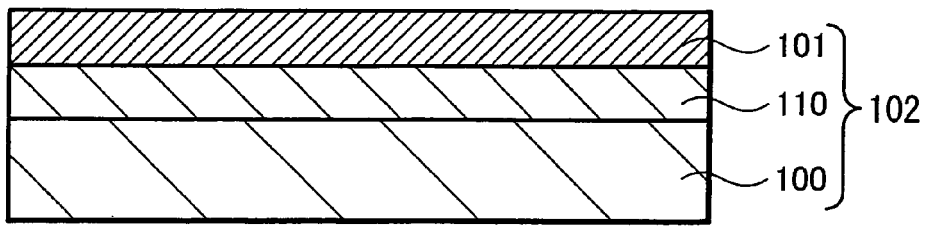
FIG. 1B
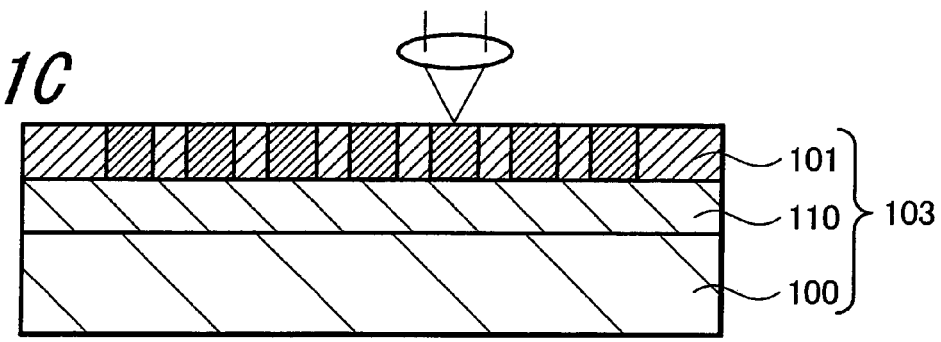
FIG. 1C
FIG. 1D
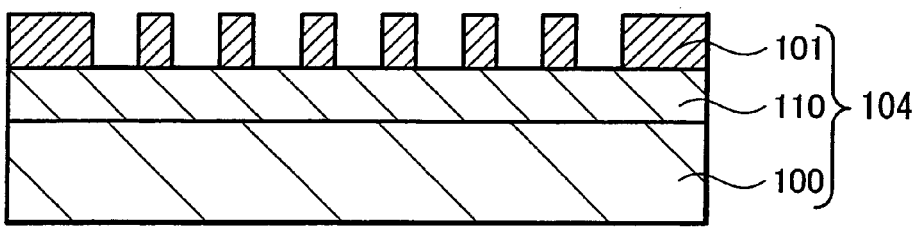
FIG. 1E
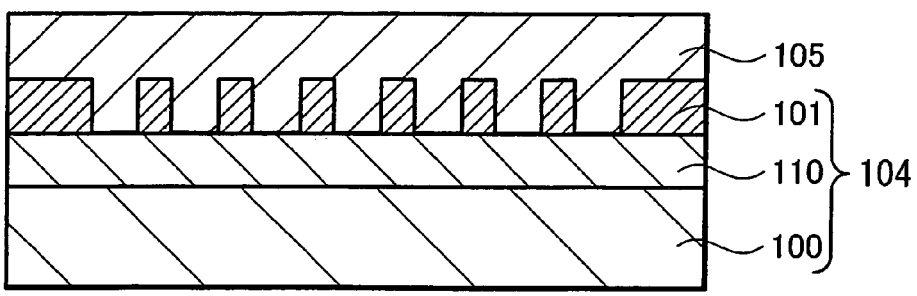

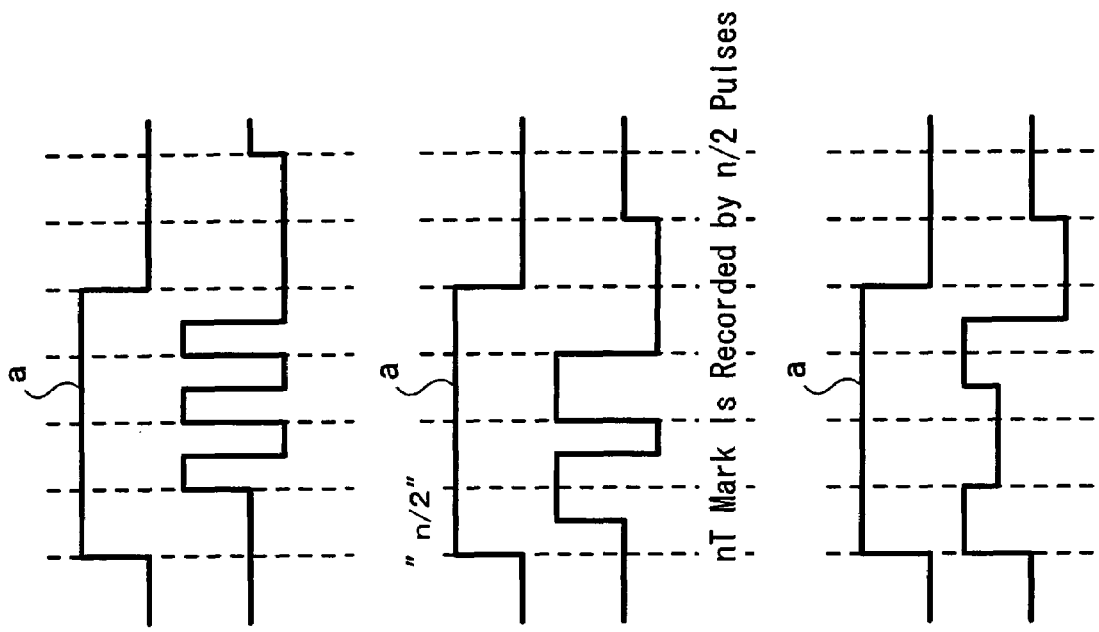
FIG. 12A (n−1) Type
FIG. 12B n/2 Type
FIG. 12C Dumbbell Type (Concave)

METHOD OF MAKING MASTER FOR MANUFACTURING OPTICAL DISC AND METHOD OF MANUFACTURING OPTICAL DISC

BACKGROUND OF THE INVENTION

The present invention relates to a method of making a master for manufacturing a stamper by transfer as well as a method of manufacturing an optical disc, in which when an optical disc is manufactured, an optical disc substrate having a concave and convex pattern of a groove for tracking, addressing or the like and a pit or the like of data recording by, for example, injection molding or 2P (Photo Polymerization) method is formed.

In recent years, the optical disc such as DVD (Digital Versatile Disc) has been in use as a recording medium in a wide range of fields.

The optical disc has the structure in which a minute concave and convex information pattern of grooves for providing various information signals, for example, an address signal and a tracking signal, pits as recording portions of data-information signal and the like are formed on an optically transparent optical-disc substrate made of polycarbonate and the like, on that pattern a reflective film made of a metal thin film such as aluminum film is formed, and further a protective film is formed thereon.

The optical disc is manufactured through the manufacturing process as shown in FIGS. 13A to 13J (See, for example, Japanese Laid-open Patent Application No. 2001-195791, Paragraphs [0002] to [0006]).

First, a glass substrate 90 is prepared (FIG. 13A) and a surface thereof is sufficiently smoothed, on which a resist layer 91 made of a light-sensitive photoresist (organic resist) is uniformly formed to make a resist substrate 92 (FIG. 13B).

Subsequently, while a laser beam for recording is made to scan spirally on the resist layer 91 of the resist substrate 92 from its inner circumference to its outer circumference or from its outer circumference to its inner circumference, the laser beam for recording on-off controlled correspondingly to an information signal pattern is applied to the resist layer 91 for forming an exposed master 93 which is exposed correspondingly to the concave and convex information pattern on the optical disc substrate to be ultimately obtained (FIG. 13C).

Next, by developing the resist layer 91, an original master 94 having a predetermined concave and convex pattern is obtained (FIG. 13D).

Next, a nickel-plated layer 95 is formed on the surface having a concave and convex pattern of the master 94 by electroforming (FIG. 13E). This plated layer 95 is exfoliated from the master 94 and is subjected to predetermined processing for providing a stamper 96 for molding, to which the concave and convex pattern of the master 94 is transferred (FIG. 13F).

By the injection molding method using this stamper for molding 96, an optical disc substrate 97 made of a polycarbonate of thermoplastic resin is molded (FIGS. 13G and 13H).

Subsequently, on the concave and convex surface of the optical disc substrate 97 are formed a reflective film 98 (FIG. 13I) of Al-alloy and a protective film 99 to obtain an optical disc 200 (FIG. 13J).

The optical disc manufactured in this way will be a product after quality examination. One of the quality items is asymmetry. The asymmetry indicates an asymmetrical characteristic of reproduced signal amplitude when a signal is reproduced, and becomes an important item as an index of quality of the signal reproduced from the optical disc and as a criterion for estimating a player and an optical pickup. Moreover, since the asymmetry is affected by dimensional variations of a concave portion (pit) among the concave and convex pattern formed on an optical disc, under circumstances where the concave and convex pattern becomes more microscopic as the latest optical disc becomes larger in capacity, the asymmetry has become a more important management item.

For the above reason, in order to suppress the dimensional variations of pits on an optical disc, the optimum manufacturing condition of each step is set in the above manufacturing process so that the asymmetry is managed so as to fall within a certain fixed range. Particularly, a process of making a master in manufacturing an optical disc is a process having a great effect on forming pits, for which a strict management is required.

Additionally, management range of the asymmetry is −5 to +15% under DVD-ROM standards.

However, since the asymmetry is recognized from a RF signal pattern when a signal is reproduced, it is difficult to measure the asymmetry from a latent image of an exposed resist layer, so that the asymmetry can be measured only from an optical disc at the stage of final product (FIG. 13J) in the above manufacturing process. Therefore, if the measured result is NG (No Good), a series of labor, manufacturing time and products so far will be wasted. Thus, in the case where malfunction occurs originating from manufacturing conditions in the exposing step, the loss will be significant.

Furthermore, since measurement results of the asymmetry proved after the final step is conventionally fed back to the manufacturing process, it is also impossible to correct promptly the manufacturing conditions. Particularly, as to the correction of manufacturing conditions in the exposing step, it takes plenty of time from a time point when the lot passes the exposing step until the corrected exposure condition based on the fed-back information from the final step of the lot is reflected. Furthermore, if the malfunction originating from manufacturing conditions occurs in the exposing step, it also takes time to investigate the cause of malfunction. Thus, it takes still more time to reflect the corrected condition with the result that the entire productivity is hindered.

Moreover, in the above exposing step, based on recording power of an exposing device, which is set correspondingly to a resist material forming the resist layer in a resist substrate, the resist layer is exposed under a fixed exposing condition. Thus, when recording sensitivity of the resist layer in the resist substrate changes, the change in sensitivity affects quality of recorded signals as it is. In addition, it is also difficult to deal with dispersion of the recording sensitivity among the lots of resist substrate.

SUMMARY OF THE INVENTION

The present invention has been made in view of the above-described problems in prior art. The present invention provides a method of making a master and a method of manufacturing an optical disc, capable of manufacturing the optical disc with high productivity and high conforming rate by allowing recorded signal characteristics of the optical disc (asymmetry) to be predicted and estimated from recorded signal characteristics of the exposed portion immediately after exposing the resist layer in the exposing step when making a master for manufacturing the optical disc, and further allowing the recording power of exposing device to be readily corrected based on the estimated result.

Specifically, inventors of the present invention utilize a phenomenon that, when an inorganic resist causing a chemical change in its state by exposure is employed for the resist in making a master for manufacturing an optical disc, reflectance of light (the amount of reflected light) and the like change correspondingly to the chemical change in the state of the inorganic resist material by the exposure; and further the inventors pay attention to a fact that correlation between reflectance or modulation factor and asymmetry obtained from the recorded signal characteristics of inorganic resist layer corresponds to correlation between reflectance or modulation factor and asymmetry in a finally obtained optical disc. As a result of concentrated investigation, a method of making a master for manufacturing an optical disc and a method of manufacturing an optical disc according to the present invention have been discovered.

A method of making a master for manufacturing an optical disc according to the present invention includes: an exposing step of applying a laser beam for recording modulated by an information signal corresponding to an information signal of a concave and convex information pattern formed on the optical disc to the inorganic resist layer formed on a substrate to form an exposed pattern corresponding to the above concave and convex information pattern on the optical disc, and a developing step of performing development processing on the inorganic resist layer after the preceding step to form a concave and convex pattern corresponding to the information concave and convex pattern by the inorganic resist layer; and in the above exposing step, a laser beam for estimation is applied to a predetermined area in the inorganic resist layer to estimate the recorded signal characteristics of the exposed pattern by the inorganic resist layer using reflected light of the laser beam for estimation and power of the above laser beam for recording is controlled based on the estimated result.

Further, according to the above-described method of making a master for manufacturing an optical disc of the present invention, a resist layer containing an incomplete oxide of transition metals is used for the inorganic resist layer.

Furthermore, according to the above-described method of making a master for manufacturing an optical disc of the present invention, the predetermined area to which the above laser beam for estimation is applied is an area other than the area irradiated with the above laser beam for recording of the inorganic resist.

Moreover, according to the above-described method of making a master for manufacturing an optical disc of the present invention, while the above laser beam for recording is applied, the above laser beam for estimation is applied to the neighborhood of a position irradiated with the laser beam for recording Furthermore, according to the above-described method of making a master for manufacturing an optical disc of the present invention, the laser beam for estimation which irradiates while the laser beam for recording irradiates is applied to unexposed area and exposed area by the laser beam for recording in the vicinity of the irradiated position with the above laser beam for recording to estimate the recorded signal characteristics of the exposed pattern of the inorganic resist layer using a ratio between a reflected light amount from the unexposed area by the laser beam for estimation and a reflected light amount from the exposed area.

Moreover, according to the method of making a master for manufacturing an optical disc of the present invention, power of the above laser beam for recording is controlled such that the ratio between reflected light amounts becomes constant.

A method of manufacturing an optical disc according to the present invention includes the steps of: making a master for manufacturing an optical disc, making a stamper for manufacturing the optical disc from the master by transfer, making an optical disc substrate by transfer using the above stamper, forming a reflective film on the optical disc substrate, and forming a protective film; and the above step of making the master has: an exposing step of applying to an inorganic resist layer formed on a substrate a laser beam for recording modulated by an information signal corresponding to an information signal of an information concave and convex pattern formed on the optical disc to form an exposed pattern corresponding to the information concave and convex pattern on the optical disc and a step of performing development processing on the inorganic resist layer to form a concave and convex pattern corresponding to the information concave and convex pattern by the inorganic resist layer after the preceding step, further in the above exposing step a laser beam for estimation is applied to a predetermined area in the above inorganic resist layer to estimate recorded signal characteristics of the above exposed pattern by the inorganic resist layer using reflected light of the laser beam for estimation, and power of the laser beam for recording is controlled based on the estimated result.

Further, according to the method of manufacturing the optical disc of the present invention, the above inorganic resist layer is a resist layer containing an incomplete oxide of transition metals.

In the above-described method of making a master according to the present invention, since such inorganic resist layer is employed that reflectance thereof differs between an exposed portion and an unexposed portion, it is possible to estimate an exposed state by applying a laser beam for estimation by utilizing the difference of reflectance. Thus, by determining the exposing power or controlling to change the exposing power based on the estimation, it is possible to obtain the characteristics required for the information concave and convex pattern of the finally obtained optical disc, specifically, for example, the asymmetry within the range of required value of −5 to +15% on DVD-ROM, in the step of exposing the resist layer.

That is, according to the present invention, by performing a test exposure before exposure processing based on the above-described information signal in the exposing step for making a master, it is possible to estimate the recorded signal characteristics of the exposed pattern by reflected light of laser beam for estimation from the test-exposed portion, to decide quality of final products under this exposure condition, and immediately from the decided result to determine the recording power of exposing device with respect to a intended area of exposure for recording.

In this connection, the estimation of recorded signal characteristics of exposed pattern means to estimate the recorded signal characteristics of exposed master, namely, whether or not the reflectance ratio or modulation factor and asymmetry fall within the predetermined range. This makes it possible to decide the recorded signal characteristics of an optical disc as final product. As is clear from a later description, this is because the above-described recorded signal characteristics of resist layer correspond mutually to the recorded signal characteristics of optical disc, specifically, the reflectance ratio or modulation factor and asymmetry.

It is noted that the laser beam for estimation has power not enough to expose the resist layer. The laser beam for estimation can be obtained by using the same laser, for example, semiconductor laser as that emitting the laser beam for recording and by changing over its power. However, when the laser beam for estimation is used simultaneously with the laser beam for exposure, or recording, it is allowed to respectively use different semiconductor lasers or make one laser beam branch by a grating, a hologram, or the like and, for example, zero order beam thereof can be used as the laser beam for recording and ± first order beam can be used as the laser beam for estimation.

Next, for example, the reflectance ratio (that is, a ratio of standardized amounts of reflected light) of resist layer, modulation factor, and asymmetry in the present invention are defined similarly to the optical disc. This will be described with reference to FIG. 10.

A curve 400 in FIG. 10A shows a reproduced signal waveform in which the reflected light amount obtained by applying the laser beam for estimation to a pit (mark) row shown in FIG. 10B by the 17PP modulation method is detected by an optical pickup device. As is shown in FIG. 10A, $I_M$, $I_{8H}$, $I_{8L}$, $I_{2H}$, $I_{2L}$ each denote the reproduced outputs, that is, the reflected light amounts (returned light amounts) from unexposed portion, 8T space, 8T pit, 2T space, and 2T pit, respectively.

The reflectance ratio is defined as a ratio $I_S/I_M$, where $I_S$ is an average of the total amount of returned light from all pits and spaces and $I_M$ is returned light from the unexposed portion. The modulation factor is defined as $(I_{8H}-I_{8L})/I_M$. The asymmetry is defined as $\{(I_{8H}+I_{8L})-(I_{2H}+I_{2L})\}/\{2\times(I_{8H}-I_{8L})\}$.

Further, because there are various lengths of pits (mark: for example exposed portion) and spaces in the exposed portion, eye patterns as shown in FIG. 11 are obtained from a photodetector on reproduction. In this case, because the 17PP modulation method is employed, the longest space and mark is 8T and the shortest space and mark is 2T.

BRIEF DESCRIPTION OF DRAWINGS

FIGS. 1A to 1J are diagrams showing steps of making a master for manufacturing an optical disc and manufacturing the optical disc according to the present invention;

FIGS. 12A to 12C are diagrams each showing an exposing signal pulse applied to the resist substrate.

DETAILED DESCRIPTION OF THE PRESENTLY PREFERRED EMBODIMENTS

Figure 1F:
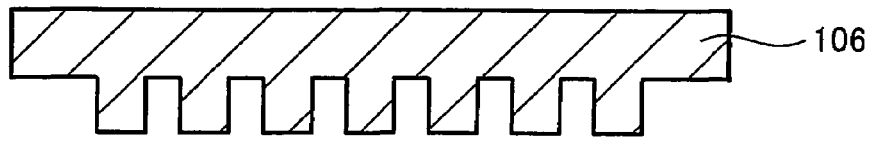

Embodiments of the method of making the master for manufacturing an optical disc and the method of manufacturing the optical disc according to the present invention will be described with showing examples.

First, the method of manufacturing the master for manufacturing an optical disc according to the present invention and manufacturing the optical disc using the master according to the present invention will be described with reference to step diagrams of FIGS. 1A to 1J.

On a substrate 100 constituting a master is formed a resist layer 101 made of a predetermined inorganic resist material by a sputtering method (FIG. 1A). This substrate 100 is made into a uniform film to obtain a resist substrate 102 (FIG. 1B).

A resist material of the resist layer 101 contains an incomplete oxide of transition metals. The incomplete oxide is such that the oxygen content is less than that of stoichiometric composition depending on the number of valence that the transition metals can take. In this case, a predetermined intermediate layer 110 may be formed between the substrate 100 and resist layer 101 to improve recording sensitivity of the resist layer 101.

Additionally, although a film thickness of the resist layer 101 can arbitrarily be set, it is preferable to fall within the range of 10 nm to 120 nm.

Subsequently, the selective exposing step is performed using an exposing device having a known laser unit to make an exposed master 103 by applying to the resist layer 101 the recording laser beam on-off modulated by the information signal corresponding to the information concave and convex pattern on the aimed optical disc (FIG. 1C). Hereupon, the incomplete oxide of transition metals constituting the resist material of resist layer 101 absorbs ultraviolet rays or visible light and so changes its chemical nature by being irradiated with the ultraviolet rays or visible light.

Further, by developing the resist layer 101, a master 104 on which a predetermined concave and convex pattern is formed can be obtained (FIG. 1D). In this case, the development can be made by utilizing the fact that, although the resist is an inorganic one, a difference is caused in an etching speed between the exposed portion and unexposed portion with respect to acid or alkaline solution, thereby allowing a so-called selective ratio to be obtained.

Next, a nickel-plated layer 105 is formed over the concave and convex pattern of the master 104 by an electroforming method (FIG. 1E). The plated layer 105 is exfoliated from the master 104 and subjected to a predetermined processing to make a stamper 106 for molding on which the concave and convex pattern of master 104 is transferred (FIG. 1F).

Figure 1G:
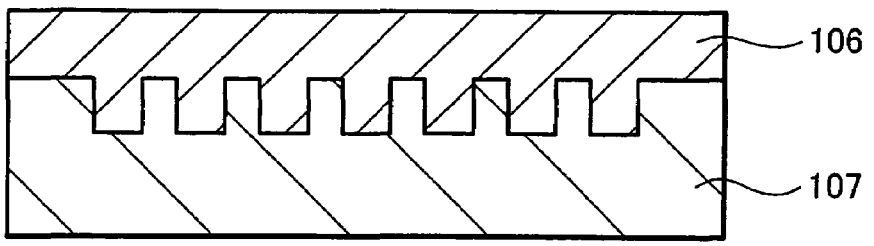
Figure 1H:
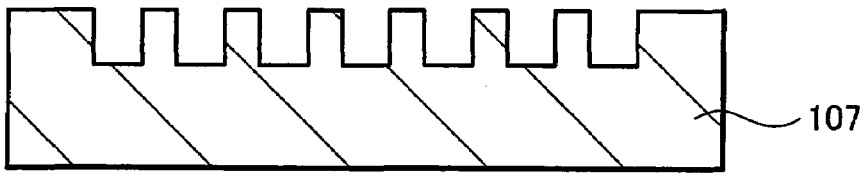
Figure 1I:
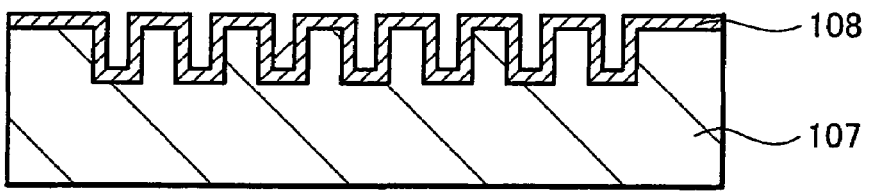

The stamper 106 for molding is used to form an optical disc substrate 107 made of thermoplastic polycarbonate resin by the injection molding (FIGS. 1G and 1H).

Figure 1J:
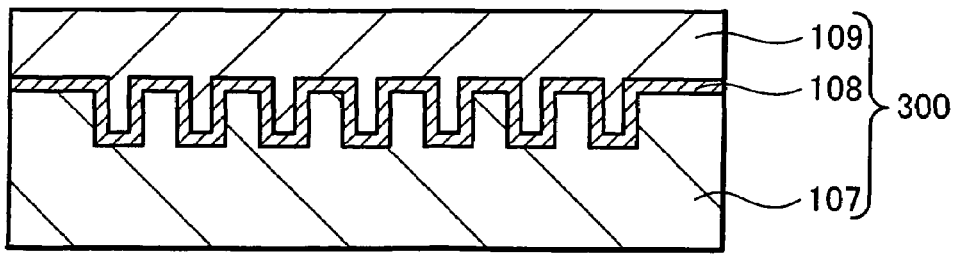

Subsequently, a reflective film 108 (FIG. 1I) made of, for example, Al-alloy and a protective film 109 are formed over the concave and convex surface of the optical disc substrate 107 to obtain an optical disc 300 (FIG. 1J).

The resist material applied to the resist layer 102 is an incomplete oxide of the transition metals. Hereupon, the incomplete oxide of transition metals is defined as a compound in which its oxygen content deviates in a less direction from that of the stoichiometric composition depending on the number of valence that the transition metals can take, namely, a compound in which its oxygen content is less than that of the stoichiometric composition depending on the number of valence that the transition metals can take. Thus, the resist layer 102 made of those materials can absorb optical energy of ultraviolet rays or visible light which transmits a complete oxide of the transition metals. This makes it possible to record a signal pattern utilizing the change in the chemical state of the inorganic resist materials.

Specific examples of the transition metals constituting the resist materials are Ti, V, Cr, Mn, Fe, Nb, Cu, Ni, Co, Mo, Ta, W, Zr, Ru, Ag and so on. Above all, Mo, W, Cr, Fe, and Nb are preferable to be used. From the viewpoint that a large chemical change can be obtained by ultraviolet rays or visible light, it is particularly preferable to use Mo and W.

In the manufacturing method according to the present invention, prior to the above-described exposing step for making the master, a resist substrate for measuring data which is similar to the above-described resist substrate 102 is prepared in advance and is exposed to attain at least any one of measured data of the above-described reflectance ratio, modulation factor, and asymmetry as its recorded signal characteristics.

When, for example, data under the 17PP modulation method is to be recorded on the aimed optical disc, the above data is recorded as the exposed pattern on the resist substrate for measuring data along, for example, a plurality of concentric circles by changing the power of laser beam for recording based on a recording signal under 17PP modulation method.

Figure 3:
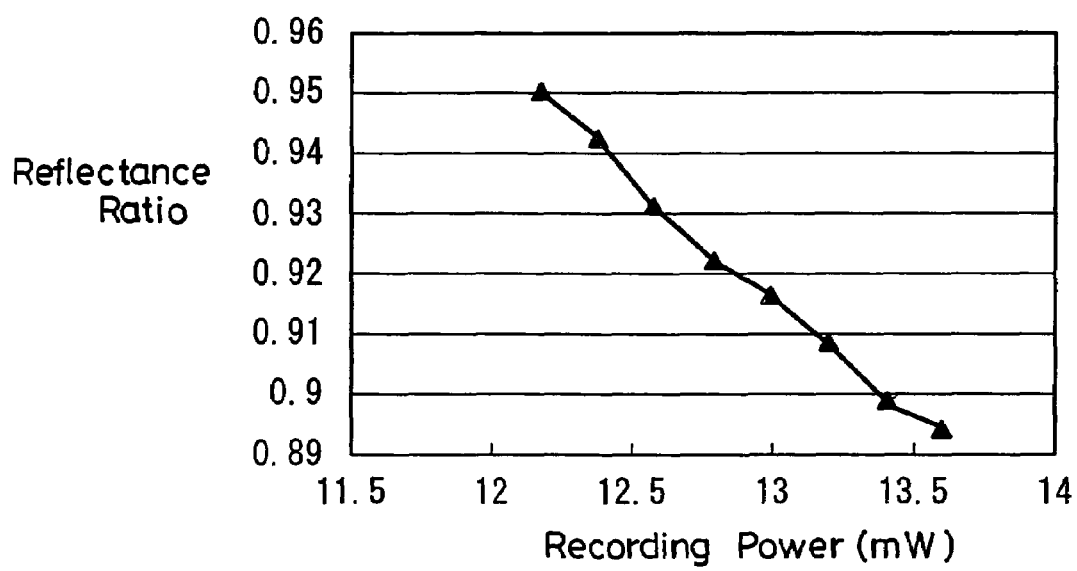
FIG. 3 is a graph showing a relation between the recording power during exposure and the reflectance ratio before and after exposure in the method of making a master for manufacturing an optical disc and the method of manufacturing the optical disc according to the present invention.

The exposed pattern obtained by changing the recording power is irradiated with the laser beam for estimation and its reflected light (returned light) is detected to obtain, for example, the reflectance ratio and further a relation between the reflectance ratio and recording power shown in FIG. 3.

Next, by means of the resist substrate for measuring data employed in this measurement, an optical disc for measuring data is made through the same steps as those shown in FIGS. 1D to 1J.

The information signal of the information concave and convex pattern formed on the optical disc for measuring data is reproduced to measure the asymmetry.

Figure 4:
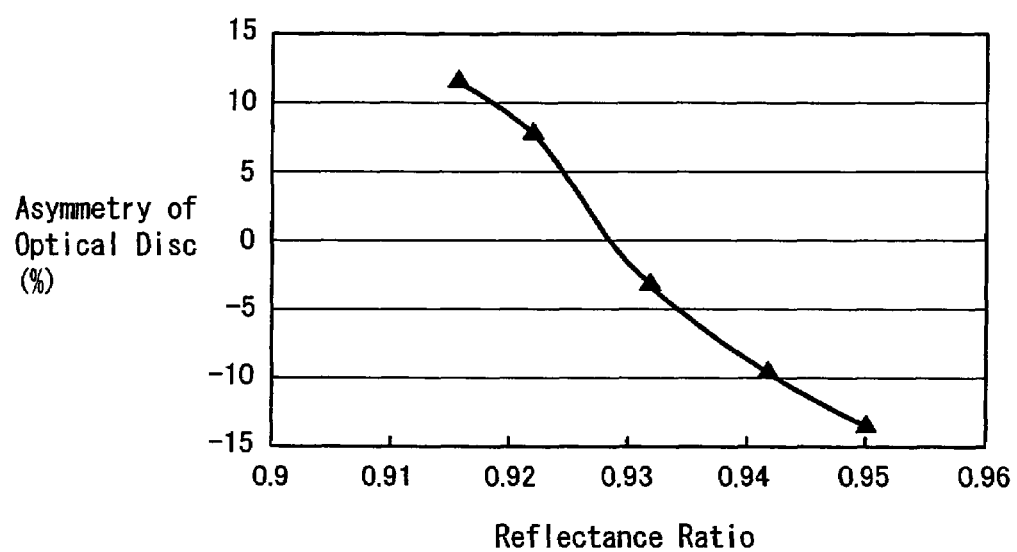
FIG. 4 is a graph showing a relation between the reflectance ratio of the exposed master and the asymmetry of recorded signal of the optical disc in the method of making a master for manufacturing an optical disc and the method of manufacturing the optical disc according to the present invention.

Thus, the relation between the asymmetry of the optical disc and the reflectance ratio of the exposed master acquired previously, shown in FIG. 4 is obtained.

Based on the data thus obtained in FIG. 4 is performed the exposure in exposing step of FIG. 1C during the process of making the master for manufacturing an optical disc, namely, the power control of laser beam for recording is performed.

In this case, data on a relation between the reflectance ratio and recording power similar to FIG. 3 is acquired for each master for manufacturing, the recording power of laser beam enabling the reflectance ratio corresponding to the asymmetry of optical disc to be obtained, and the exposure being performed under the controlled recording power.

Specifically, in this case, a test exposure is performed on the resist substrate 102 for example, in which the power of recording laser beam toward its invalid area, that is, an area outside the area employed to make the stamper, for example, the invalid area of outer circumference is changed. The laser beam for estimation is applied to this exposed portion to measure its recorded signal characteristics (reflectance ratio, modulation factor, asymmetry) and the results are compared to the measured data of FIG. 4 obtained previously to estimate the exposing power, that is, the power of recording laser beam capable of providing the asymmetry required for the finally obtained optical disc. Then, all recording area is exposed using this power.

Unless a change in recording sensitivity of the resist substrate is extremely large, this method can particularly put the asymmetry of recorded signal on optical disc within a range that meets the standard with high accuracy.

Moreover, if the change in recording sensitivity of the resist substrate is large, while the laser beam for recording is applied in the exposing step, the laser beam for estimation is also applied to both of the unexposed area and exposed area near the irradiated position with the laser beam for recording. From a ratio of reflected light amount from the exposed area to reflected light amount from the unexposed area obtained by the laser beam for estimation applied to both of the unexposed area and exposed area, the recorded signal characteristics (reflectance ratio, modulation factor, asymmetry) of the resist layer 101 is estimated, and the recording power of laser beam for recording is corrected based on the result of the estimation so as to make that ratio constant.

Particularly, since a state of the exposing device and a state of the substrate become factors in changing manufacturing conditions in the exposing step, this correction is effective. Further, since similar recorded signal characteristics are generally obtained in neighboring areas on the resist substrate 102, the correction by this method is effective.

Additionally, it is desirable to know, for example, characteristics of a machine for sputtering the resist using another resist substrate and to adjust the form of irradiation (the shape of a spot) of the estimating laser beam depending on the tendency of variations in recording sensitivity. When there is, for example, a small difference in recording sensitivity and a gradual difference in recording sensitivity exists in a radial direction, the spot of laser beam for estimation is made into an elliptic spot having a major axis in a radial direction of the resist substrate.

Moreover, by adjusting recording power of the laser beam for recording so that the above-described ratio of the reflected light amount of the laser beam for estimation may become fixed, it is possible to make the asymmetry of recorded signal of the finally obtained optical disc over the whole disc fixed. This method is effective particularly when recording sensitivity of the resist substrate changes unavoidably due to variations in film thickness of the resist layer and the like in a radial direction, and can correct appropriately variations in the exposed result due to the change in recording sensitivity.

Furthermore, by obtaining beforehand a relation between the reflectance ratio and asymmetry, it is possible to predict and estimate the recorded signal characteristics of the optical disc from the above relation between the reflectance ratio and asymmetry obtained previously, in which while laser beam for recording is applied to the resist layer 101 on resist substrate 102, the laser beam for estimation is applied to a predetermined area in the vicinity of the position irradiated with the laser beam for recording, and the reflected light amount when applying the laser beam for estimation is detected.

According to this method, the asymmetry of recorded signal characteristics of the finally obtained optical disc can be assumed from the exposed master, so that the signal quality of final products can be predicted and decided at the stage of exposing step.

Figure 2:
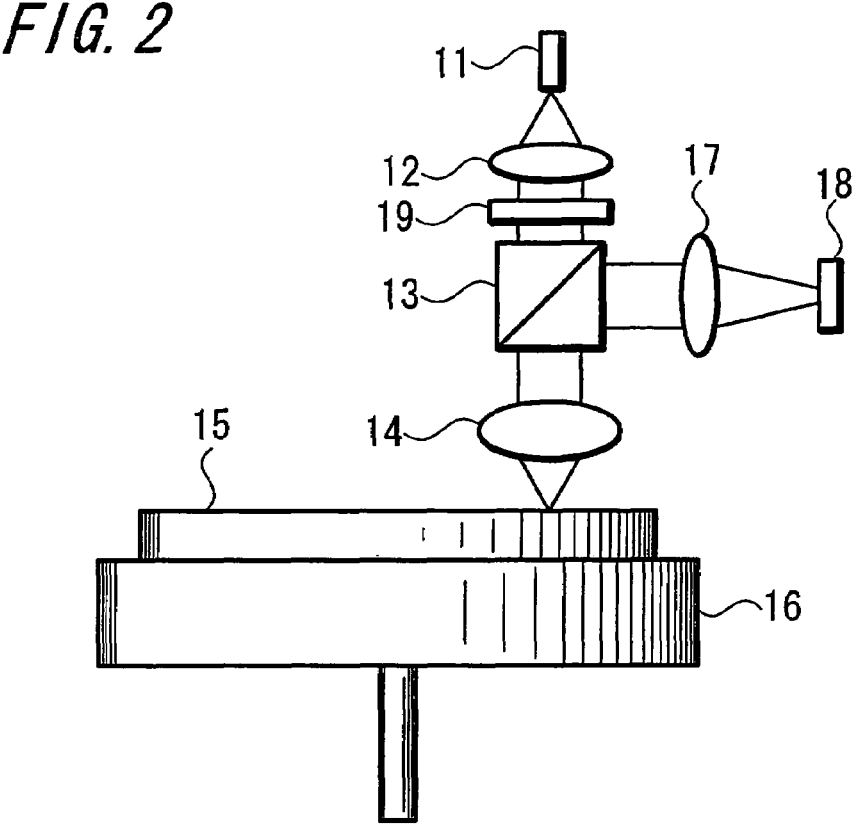
FIG. 2 is a diagram schematically showing an exposing device employed in the step of exposing resist layer according to the present invention.

FIG. 2 shows the structure of an exposing device employed in the resist exposing step. This device includes a beam source 11 which generates a beam, for example, a laser beam exposing the resist layer. The laser beam passes through a collimator lens 12, a grating 19, a beam splitter 13 and is focused and applied by an objective lens 14 onto the resist layer of resist substrate 15. In this exposing device, reflected light from the resist substrate 15 is focused on a divided photodetector 18 through a splitter 13 and a condenser lens 17. The divided photodetector 18 detects the reflected light from resist substrate 15, produces a focus error signal obtained from the detected result, and sends it to a focus actuator (not shown). The focus actuator controls a position of the objective lens 14 in a vertical direction. A turntable 16 is provided with a forwarding mechanism (not shown) and is capable of changing an exposed position on the resist substrate 15 with high accuracy.

The exposing device performs the exposure while controlling the laser beam source 11 by a laser driving circuit (not shown) based on an information signal and a reflected light amount signal.

Furthermore, the central axis of turntable 16 is provided with a spindle-motor control system which sets the optimum spindle revolving speed to control the spindle motor based on a radial position of the optical system and a desired linear velocity.

When the resist layer is to be exposed, the resist substrate 15 is first set to be arranged on the turntable 16 of the exposing device shown in FIG. 2 with the surface of resist film facing upward.

Subsequently, by applying a laser beam to the resist substrate 15 from the beam source 11 and moving it in a radial direction of the turntable while rotating the resist substrate 15 mounted on turntable 16, a signal pattern in the form of a spiral or concentric circles is recorded on the resist layer from its inner circumference to its outer circumference or from its outer circumference to its inner circumference on the principal plane of the resist substrate 15. Specifically, if light intensity of a beam spot condensed on the resist substrate 15 exceeds certain extent, a change in the chemical state is caused in the inorganic resist material on the resist substrate 15 and a recorded mark is formed. Thus, in actual exposure, emitted light amount from the beam source 11 is changed correspondingly to the recording signal pattern to form a recorded mark pattern of the resist layer, whereby signal recording is performed.

[Method of Making Master for Manufacturing Optical Disc]

The method of making a master for manufacturing an optical disc according to the present invention is a method performed in the stage of exposing step in FIG. 1C, and is capable of extracting a signal from an exposed master similarly to extracting a signal from an optical disc by an optical pickup to estimate the signal, by utilizing a difference in reflectance of light such as laser beam due to a difference in a chemical state of the inorganic resist material in the exposing step. The details will be described in the following. It is noted here that the exposed master means the resist substrate after being exposed and before being developed.

In the resist-layer exposing step in FIG. 1C, the laser beam for estimation is applied in a state where the resist substrate 15 before being exposed is set to be arranged on the turntable 16 of exposing device in FIG. 2 with the surface of resist film facing upward (S1).

Specifically, while the laser beam having less power than that in exposure is applied to the resist substrate 15 from the beam source 11 and the resist substrate 15 mounted on the turntable 16 is rotated and moved in the radial direction of the turntable, whereby the principal plane of the resist substrate 15 is irradiated with the laser beam from its inner circumference to outer circumference or from outer circumference to inner circumference relatively scanning the resist layer along a spiral or concentric circles. Hereupon, power of the laser beam on this occasion needs only to be approximately one thirtieth of that in the exposure.

Figure 10A:
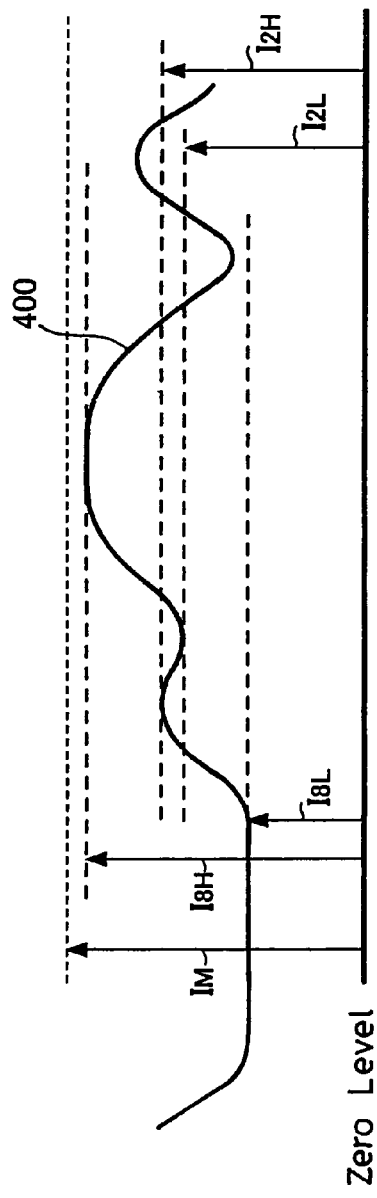
FIGS. 10A and 10B are diagrams showing a relation between the pit row of the exposed pattern on the exposed master and reproduced signal (reflected light amount) therefrom for explaining the present invention.
Figure 10B:
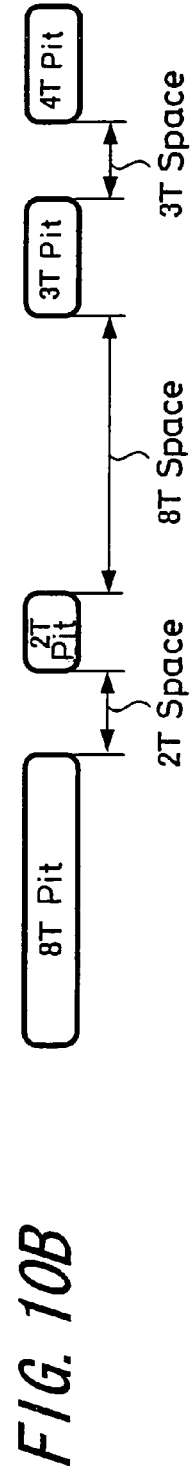
Figure 11:
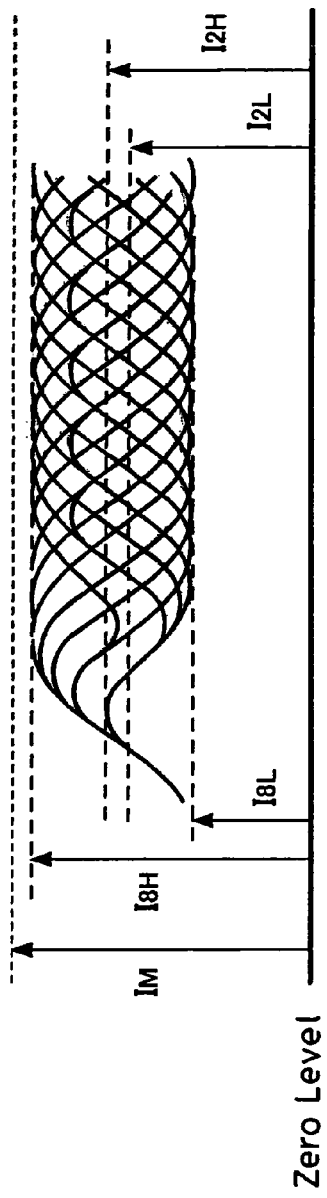
FIG. 11 is a waveform diagram of the reproduced signal from the exposed pattern on the exposed master for explaining the present invention.
Figure 13A:
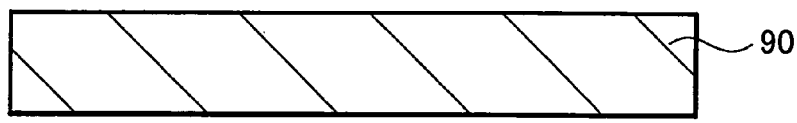
FIGS. 13A to 13J are diagrams showing steps of manufacturing the conventional optical disc.
Figure 13B:
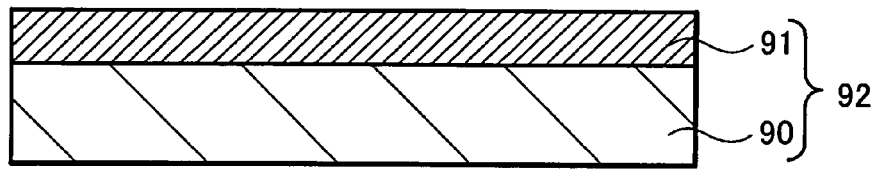
Figure 13C:
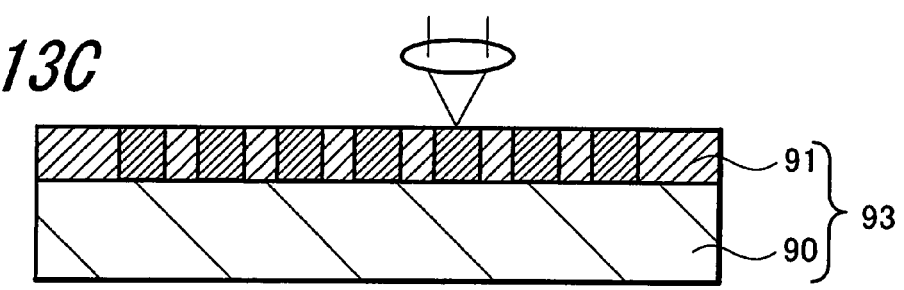
Figure 13D:
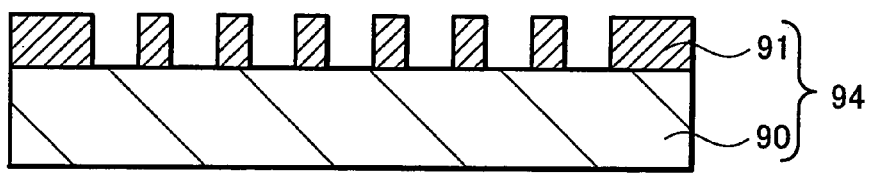
Figure 13E:
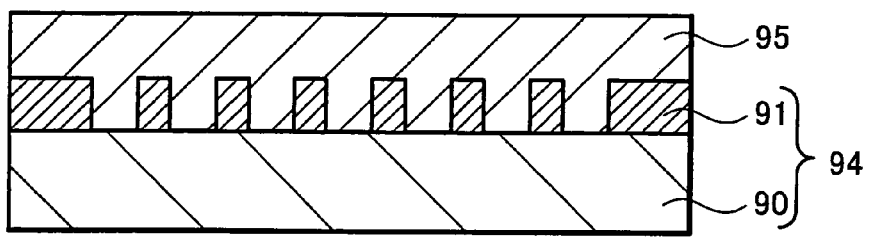
Figure 13F:
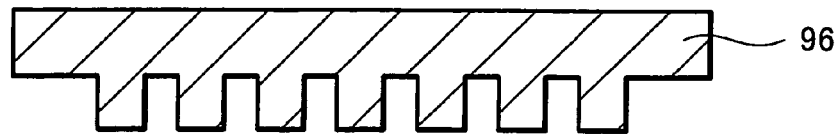
Figure 13G:
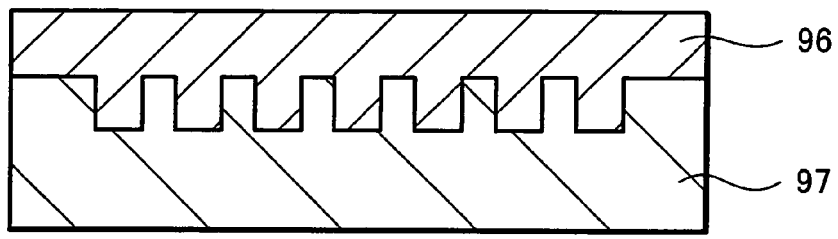
Figure 13H:
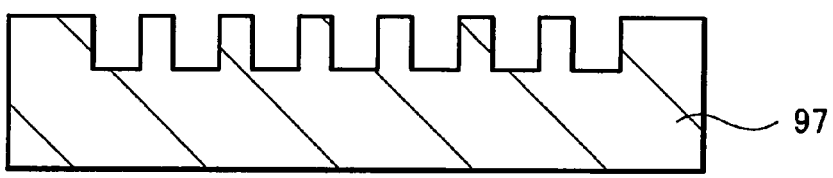
Figure 13I:
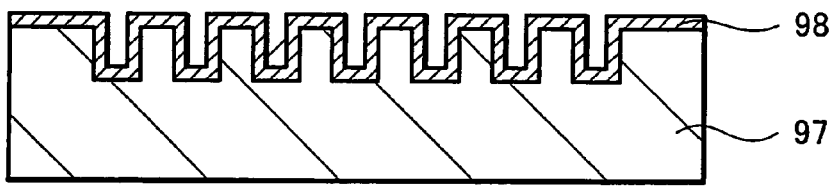
Figure 13J:
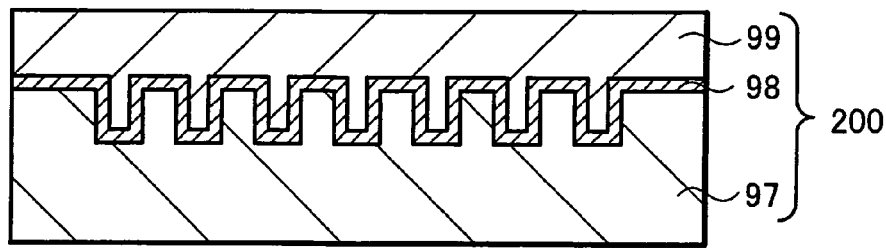

The light reflected by resist layer of the laser beam applied in step S1 is detected by the photodetector 18 through the beam splitter 13 and condenser lens 17 of the exposing device (S2). Because a low-frequency component of the signal detected by the photodetector 18 is correlated with the reflectance of the resist layer, a varying state in the radial direction of the reflected light amount ($I_M$ in FIG. 10A) of the resist layer before exposure is known from the detected signal (S3).

Next, the laser beam is applied with a predetermined recording power to expose the resist layer by a recording signal, for example, recording signal corresponding to 17PP modulation method based on a later described exposure-controlling method (S4). On this occasion, of the incomplete oxide of transition metals forming the resist layer, those in areas irradiated with the recording laser beam change in its chemical nature.

Subsequently, under the same condition as step S1, the laser beam is applied relatively scanning along signal-recorded portions (pit rows, grooves, or the like) recorded on the resist layer of the resist substrate 15 in the form of a spiral or concentric circles (S5).

Then, similarly to step S2, the light reflected by resist layer of laser beam applied in step S5 is detected by the photodetector 18 through the beam splitter 13 and condenser lens 17 (S6). From the signal detected by the photodetector 18, the varying state in the radial direction of the reflected light amounts ($I_{8H}$, $I_{8L}$, $I_{2H}$, $I_{2L}$) of resist layer after exposure is derived (S7).

Next, based on the varying state in the radial direction of reflected light amount before exposure in step S3 and the varying state in the radial direction of reflected light amount after exposure in step S7, a varying state in the radial direction of the reflectance ratio in each position is obtained (S8). This reflectance ratio represents a ratio between reflectance before exposure and reflectance after exposure with the reflectance before exposure of resist layer in a detecting point of the exposed master as a basis, and depends on substrate conditions (a kind of substrate, a kind and thickness of intermediate layer), resist conditions (a kind of inorganic resist, thickness, and so on) and exposure conditions (wavelength of light, recording power, and the like).

Then, based on the relation measured in advance between reflectance ratio and asymmetry of optical disc (FIG. 4), the varying state in the radial direction of the asymmetry of finally manufactured optical disc (FIG. 7) is inferred from the varying state in the radial direction of reflectance ratio obtained in step S8 to verify the quality of signal for the exposed master (S9). For example, in case of an exposed master for DVD-ROM, the quality is decided based on whether or not the asymmetry on the whole surface of recorded area of finally manufactured optical disc falls within the range of, for example, +5 to +10%.

The step S8 and step S9 will be described further in detail.

An example of a relation between the recording power in exposure and the reflectance ratio before and after exposure is shown in FIG. 3. In this example, the exposed master was actually made using a silicon substrate, an incomplete oxide of trivalent W and trivalent Mo for a resist material, and a laser beam having a wavelength of 405 nm in accordance with the above-described method of estimation, and then the recording and estimation were performed under the condition that the beam spot of laser beam for recording and the beam spot of laser beam for estimation have the same fixed diameter.

In FIG. 3, a tendency is recognized in which as the recording power of recording laser beam increases, the reflectance ratio decreases. This is because, while the reflectance decreases owing to a change in a chemical state of the inorganic resist material after exposure, as the recording power becomes larger, an area whose reflectance decreases (a mark recorded on resist layer) becomes larger. Therefore, it is not always preferable that the reflectance ratio is small. If the reflectance ratio is too small, a concave portion (or a convex portion) on the optical disc expands too wide and may deviate from signal standards such as asymmetry of recorded signals on the optical disc. Thus, to satisfy the signal standards, the reflectance ratio must fall within some range. The reference example is shown in FIG. 4.

FIG. 4 shows a result of measuring the asymmetry of an optical disc manufactured in accordance with steps in FIGS. 1A to 1J using the exposed master made based on FIG. 3. In FIG. 4, a correlation of one-to-one correspondence is recognized between the reflectance ratio and asymmetry. It is seen that, for example, if the reflectance ratio is within the range of 0.920 to 0.925, the asymmetry will fall within the range of +5 to +10% (manageable limits of DVD-ROM).

Therefore, as described above, if the relation graph is obtained beforehand, it is possible to infer the asymmetry of recorded signal on optical disc manufactured using the master from the reflectance ratio of the exposed master before development and to estimate whether the signal conforms to the standard or not. Moreover, even if the recording sensitivity is different because of some difference in structure of the resist substrate such as a thickness of the resist layer, each of the relations shown in FIGS. 3 and 4 is maintained. Thus, if the exposed master has the same structure, there is no need to worry about some variations between lots. However, it is premised that the manufacturing condition after the step of developing the resist layer is fixed.

Furthermore, in the step S7 of the above-described method of estimating exposure, it is also possible to obtain the asymmetry or modulation factor of the signal recorded on the exposed master from a high-frequency component of the signal detected by the photodetector 18. To be specific, a change in the reflectance of exposed portion causes a difference in the reflectance between exposed area and unexposed area. When the laser beam for estimation is applied to those areas, an RF signal pattern is obtained from a diffractive phenomenon occurring due to the difference and from the RF signal pattern, the asymmetry and modulation factor can be obtained. The similar relations to those in FIG. 3 and FIG. 4 is also recognized between the thus obtained asymmetry and modulation factor, and the asymmetry of recorded signals on the optical disc manufactured by developing the exposed master. Therefore, similarly to the above exposure-estimating method, it is possible to infer the asymmetry of recorded signals on the optical disc manufactured by an exposed master from the asymmetry of the exposed master before development and to estimate as to whether the signal conforms to the standard or not.

As described above, according to the exposure-estimating method of the present invention, it is possible to predict and estimate the signal quality of the optical disc manufactured from the exposed master in the step of exposing the resist layer.

[Exposure-Controlling Method]

Next, the step S4 in the above-described method of making a master for manufacturing an optical disc will be described in detail.

In the exposing step of FIG. 1C, the exposure-controlling method performs estimation regarding the recorded signal characteristics of exposed pattern on the resist substrate utilizing the above-described exposure-estimating method, and based on the estimated result the recording power of recording light onto the resist substrate is adjusted. The details will be described below.

A first embodiment of an exposure-controlling method according to the present invention will be described.

A test exposure is performed using a resist substrate before being exposed on a portion which is not a recording area of optical disc, such as its inner circumference and outer circumference on the principal plane of the resist substrate (unused portion under the disc standard), and the reflectance ratio, asymmetry and modulation factor of the exposed portion before and after the exposure are measured to obtain the relation with the recording power as shown in FIG. 3 (S11).

Next, in order to attain a target value (for example +9%) of the asymmetry of the recorded signal on optical disc, the reflectance ratio (or the asymmetry or modulation factor of the exposed master) is obtained from the relation between the reflectance ratio (or the asymmetry or modulation factor of the exposed master) previously obtained as shown in FIG. 4 and the asymmetry of recorded signals on the optical disc (S12).

Subsequently, in order to attain the reflectance ratio (or the asymmetry or modulation factor of the exposed master) obtained in the step S12, recording power of the laser beam for recording is obtained from the relation between "the recording power of laser beam for recording" and "the reflectance ratio (or the asymmetry or modulation factor of the exposed master)" acquired in step S11 (S13).

The step of exposing resist layer is performed under the condition of recording power obtained in step S13 (S14).

When fluctuations in the recording sensitivity of the resist substrate are small, it is possible to make the asymmetry of the recorded signal on optical disc fall within the range conforming to the standard with high accuracy using the above method.

A second embodiment of the exposure-controlling method according to the present invention will be described with reference to FIG. 5.

In this method, the estimation of signals near the exposed portion is performed while the laser beam for recording is scanning and the estimated result is immediately fed back to the recording power of laser beam for recording to adjust the power.

Figure 5:
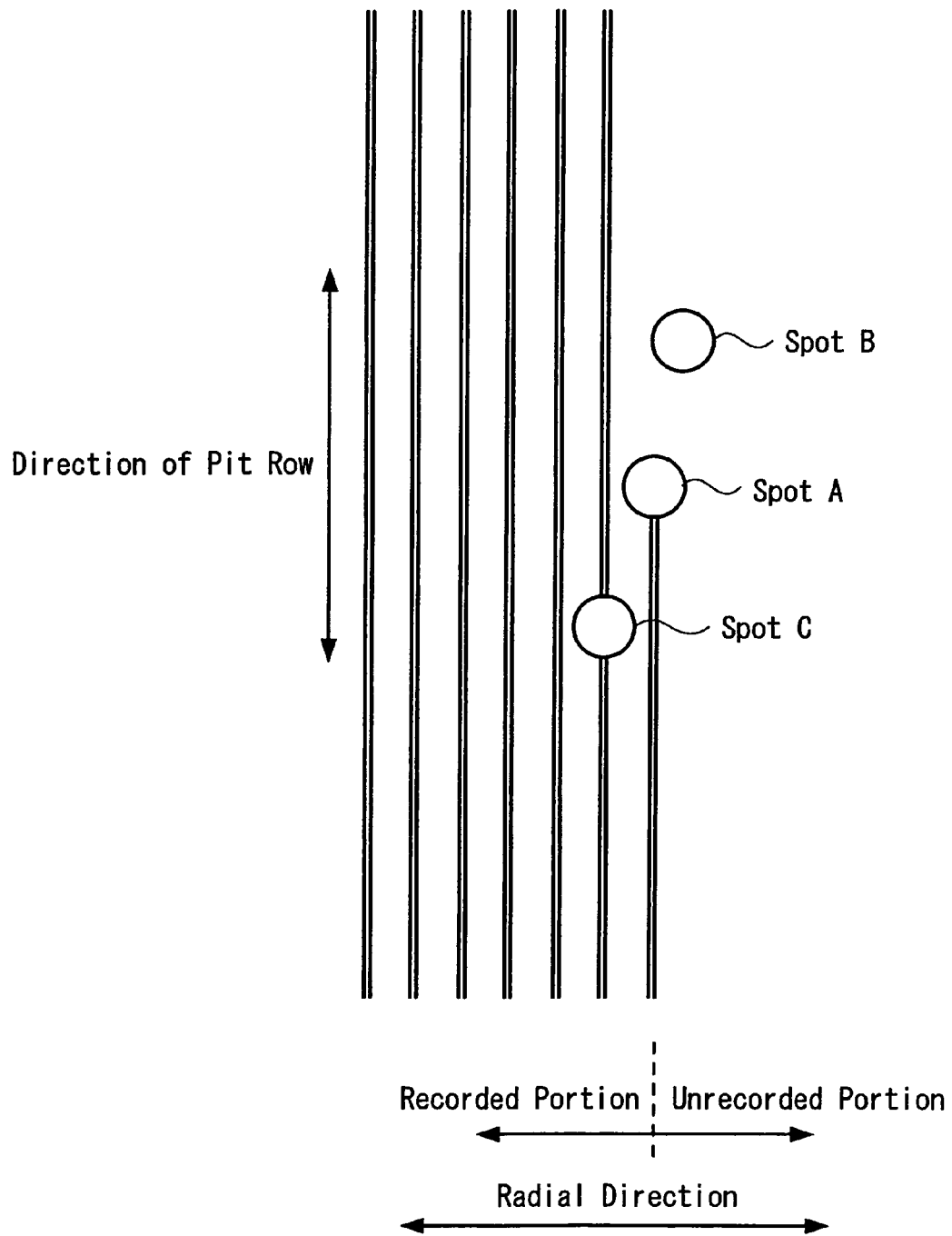
FIG. 5 is a diagram showing a mode of exposure in an embodiment of the method of the present invention.

FIG. 5 shows a mode of the exposure-controlling method according to the present invention in the exposing device of FIG. 2, in which three beams of laser light are applied to the surface of the resist layer of the resist substrate and are scanning in the direction of pit rows in the step of exposing resist layer.

By making use of the grating 19 in the exposing device in FIG. 2, a laser beam from the beam source 11 is divided into three beams which are applied to the surface of the resist layer to form light spots A, B and C each having the same diameter. In this example, the spot A performs recording. Each of the spots B and C has equally small power of about one thirtieth of that of spot A and is used to read a signal of the resist layer. With the spot A being centered, those spots B and C are arranged in the vicinity thereof.

In this mode, the control of exposure is performed as follows.

First, in order to attain a target value of the asymmetry (for example +9%) of the recorded signal of the optical disc, the reflectance ratio R is obtained from the relation previously obtained as shown in FIG. 4 between the reflectance ratio and the asymmetry of the recorded signal of the optical disc (S21). At the start of exposure, a laser beam for recording is applied to the spot A, which has the recording power obtained from the relation attained in advance between recording power of the laser beam for recording and reflectance ratio as shown in FIG. 3 to acquire the reflectance ratio R.

The spot B is arranged to precede the recording spot A in the direction of actual beam-scanning for measuring the reflected light amount from the resist layer before being exposed (S22). The spot C is arranged to lag behind the recording spot A in the direction of actual beam-scanning for measuring the reflected light amount from the resist layer after being exposed (S23). Each of the reflected light amounts is detected and measured from reflected light on the respective spots by the divided photodetector 18 through the beam splitter 13 and condenser lens 17 shown in FIG. 2.

Next, a ratio between those reflective light amounts, namely, "reflected light amount on spot C"/"reflected light amount on spot B" is obtained (S24). This ratio between reflected light amounts corresponds to the reflectance ratio described in the above method of estimating exposure.

The reflectance ratio R obtained in step S21 is compared with the ratio between reflected light amounts obtained in step S24 to confirm whether or not they correspond with each other (S25).

When they correspond, application of laser beam (exposure) under the condition of that recording power is continued (S26).

If they do not correspond, the relation between the recording power and reflectance ratio of the recording laser beam is corrected based on the relation between recording power in step S21 and ratio of reflected light amount in step S24 (S27). For example, a revised recording power is obtained from the relation between the recording power and ratio of reflected light amounts (reflectance ratio) of the recording laser beam in FIG. 3, and the condition of power of the laser beam of spot A is corrected to perform exposure (S28).

A sequence of processing from steps S22 to S28 is performed continuously in a fraction of time (μs order) while the surface of resist layer of the resist substrate is irradiated with the three laser beams and is scanned in the direction of pit rows.

Figure 6:
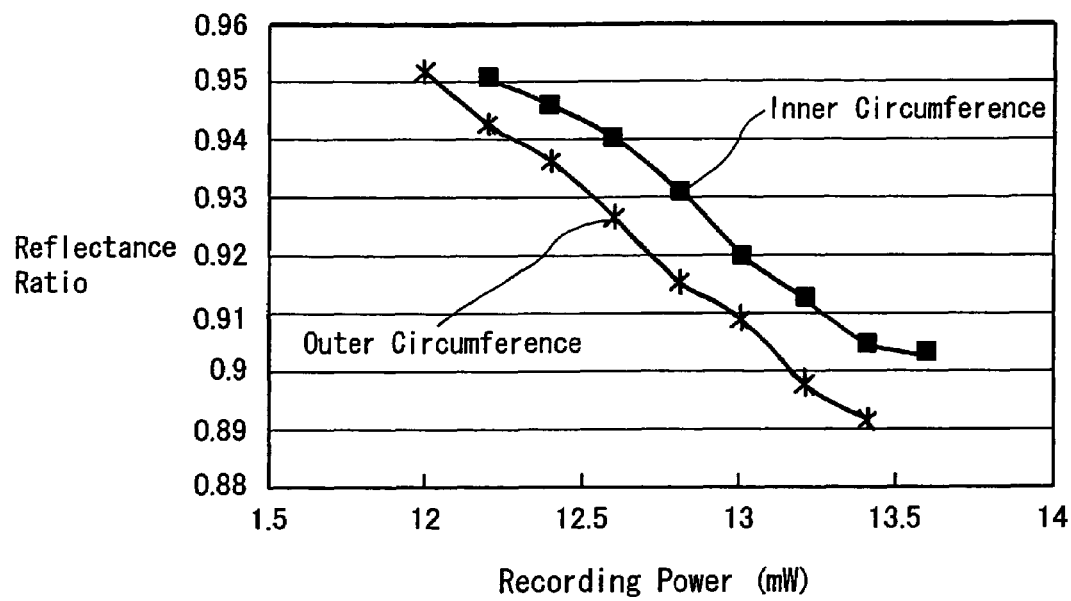
FIG. 6 is a graph showing a relation between the recording power during exposure and the reflectance ratio before and after exposure in the resist substrate having different recording sensitivity between its inner circumference and its outer circumference.
Figure 7:
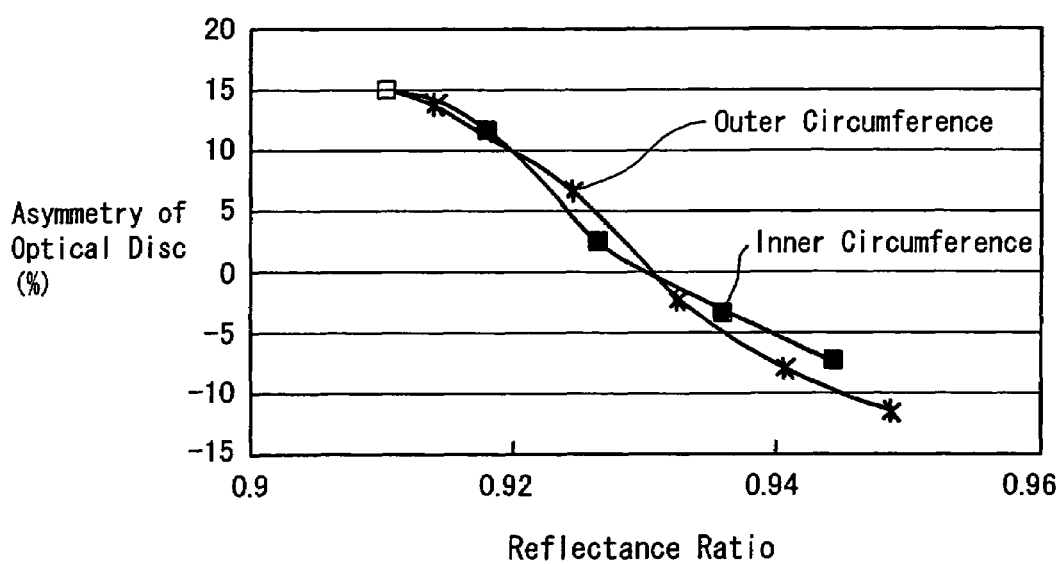
FIG. 7 is a graph showing a relation between the reflectance ratio of the exposed master and the asymmetry of recorded signal of the optical disc when the resist substrate having different recording sensitivity between the inner circumference and outer circumference is used.

According to the above-described method of controlling exposure, the recording power of laser beam for recording can be controlled such that the ratio of reflected light amounts always be constant, thereby making the asymmetry of the recorded signal of the optical disc manufactured from its exposed master constant. Particularly, according to the above method of controlling exposure, even if there is a difference in the recording sensitivity between the inner circumference and outer circumference of the resist substrate as shown in FIG. 6, the relation between "the reflectance ratio of the exposed master" and "the asymmetry of the optical disc" is maintained similarly to FIG. 4, as shown in FIG. 7; and therefore, using the above method of controlling exposure enables such signal quality that is stable over the whole optical disc to be obtained.

Next, a third embodiment of exposure-controlling method according to the present invention will be described with reference to FIG. 8. This method is acquired by improving the second embodiment such that the method can cope with a resist substrate that has a small gradual difference in the recording sensitivity in its radial direction.

Figure 8:
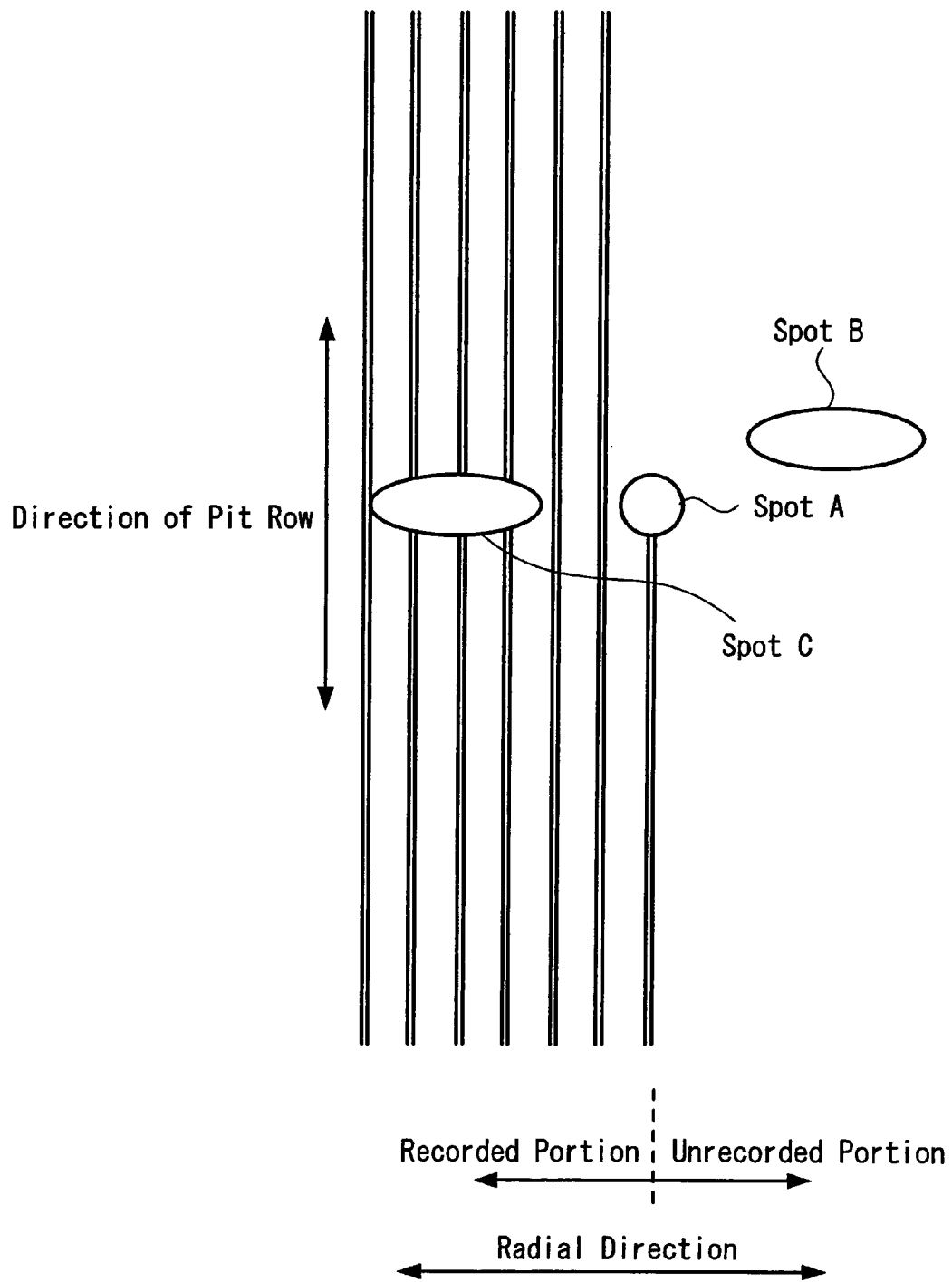
FIG. 8 is a diagram showing a mode of exposure in another embodiment of the method of the present invention.

Specifically, referring to FIG. 8, a laser beam from the beam source 11 is divided into three beams each of which is irradiated on the surface of resist layer by making use of the grating 19 of the exposing device in FIG. 2, to form a light spot A of perfect circle as well as light spots B and C of elliptical shapes having the major axis in the radial direction of the resist substrate. In this example, the spot A performs recording, whereas each of the spots B and C has equal small power which is about one thirtieth of that of spot A and is used to read a signal of the resist layer. In addition, the spots B and C are arranged on both sides and in the proximity of the spot A.

The exposure-controlling in this mode is similar to those in the above second embodiment. According to this method, the recording power of recording laser beam can be controlled such that the ratio of reflected light amounts always be constant, thereby enabling the asymmetry of the recorded signal of the optical disc manufactured from its exposed master to be constant. Particularly, according to this method of controlling exposure, such a resist substrate that has a small gradual difference in recording sensitivity in the radial direction can be controlled with high precision.

Moreover, the method of controlling exposure according to this embodiment has also an advantage in which an angle adjustment of the grating and a position adjustment of the optical system of the recording laser beam are more simplified than the second embodiment.

Further, the exposure-controlling method and exposure-estimating method according to the present invention are also applicable to a method of exposing the inorganic resist material with a combination of a laser beam and light of a mercury-vapor lamp. An example thereof is the combination of a red semiconductor laser beam having a wavelength of 660 nm and light of a mercury-vapor lamp having peak at wavelengths of about 185 nm, 254 nm and 405 nm.

Practice Example

A master was actually made in accordance with the manufacturing steps shown in FIGS. 1A to 1J using the incomplete oxide of trivalent W and trivalent Mo for the resist material, and then the optical disc was finally manufactured. Particularly, in the step of exposing the resist layer, the exposure was controlled using the exposure controlling method of the second embodiment. The content of the practice will be described below with reference to FIGS. 1A to 1J.

To begin with, a silicon wafer was employed as the substrate 100 (FIG. 1A), on which the intermediate layer 110 made of amorphous silicon was uniformly deposited with a film thickness of 80 nm by a sputtering method. Subsequently, the resist layer 101 made of the incomplete oxide of W and Mo was deposited uniformly on the intermediate layer 110 by a sputtering method (FIG. 1B). On this occasion, the sputtering was performed under an argon atmosphere using a sputter target made of the incomplete oxide of W and Mo. At this point, when the deposited resist layer was analyzed by EDX (Energy Dispersive X-ray Analysis), the deposited incomplete oxide contained W and Mo in the ratio of 80:20, and an oxygen content of 60 at. %. Further, the resist layer had a film thickness of 55 nm.

The resist substrate on which the resist layer had been deposited was mounted on the turntable of the exposing device shown in FIG. 2. Subsequently, while the turntable was made to rotate at a desired revolving speed, a laser beam with irradiating power less than the threshold value was applied and a position in the height direction of the objective lens was set by an actuator such that the laser beam focuses on the resist layer.

Next, while the optical system was fixed, the turntable was moved to a desired radial position by a forwarding mechanism provided with the turntable, and a laser beam from one beam source was divided into three beams by making use of the grating of exposing device for irradiating the surface of resist layer. On this occasion, by the spot A the resist layer is irradiated with an irradiating pulse corresponding to pits depending on information data to be exposed. The spot B was used for measuring the reflected light amount of the resist layer before exposure. In this case, the exposure was controlled based on the exposure-controlling method shown in the above second embodiment so that the asymmetry of the recorded signal of the optical disc may be +9.5%, that is, the reflectance ratio may be 0.92.

Moreover, on this occasion, while the turntable was being rotated, the turntable was moved continuously and slightly in the radial direction of the resist substrate for exposure. The exposing condition at that time is shown below.

Exposing Wavelength: 405 nm
Numerical Aperture of Exposing Optical System NA: 0.95
Modulation Method: 17PP
Pit Length: 112 nm
Track Pitch: 320 nm
Linear Velocity in Exposure: 4.92 m/s
Writing Method: The same simplified writing method as in the phase-change disc
Recording Power (initial value): 13.0 mW (spot A)
Estimating Power: each 0.2 mW (spots B and C)

After the above exposure, the predetermined development, electroforming, injection molding, reflective-film formation, and protective-film formation were performed with the result that an optical disc having a diameter of 12 cm was obtained. Additionally, in the above process of obtaining the optical disc from the exposed master, the known technique was employed. It was confirmed that the obtained optical disc had pits including a pit of 130 nm in length, a linear pit of 149 nm in width, or the like formed correspondingly to the actual signal pattern and had a recording capacity of 25 GB.

Comparison Example

Of the manufacturing process of the optical disc in the above practice example, in the step of exposing resist layer, the exposure-controlling method of the present invention was not applied, instead the conventional exposing method (of a constant recording power) was applied to manufacture an optical disc. Other than that, the optical disc was manufactured under the same condition as those of the practice example.

Additionally, when the laser beam for estimation was applied to the exposed master after the completion of exposing step to estimate the recorded signal characteristics (reflectance ratio) according to the present invention, it was predicted that only the range from 37 mm to 40 mm in disc radius would satisfy the signal characteristics of the final product.

Figure 9:
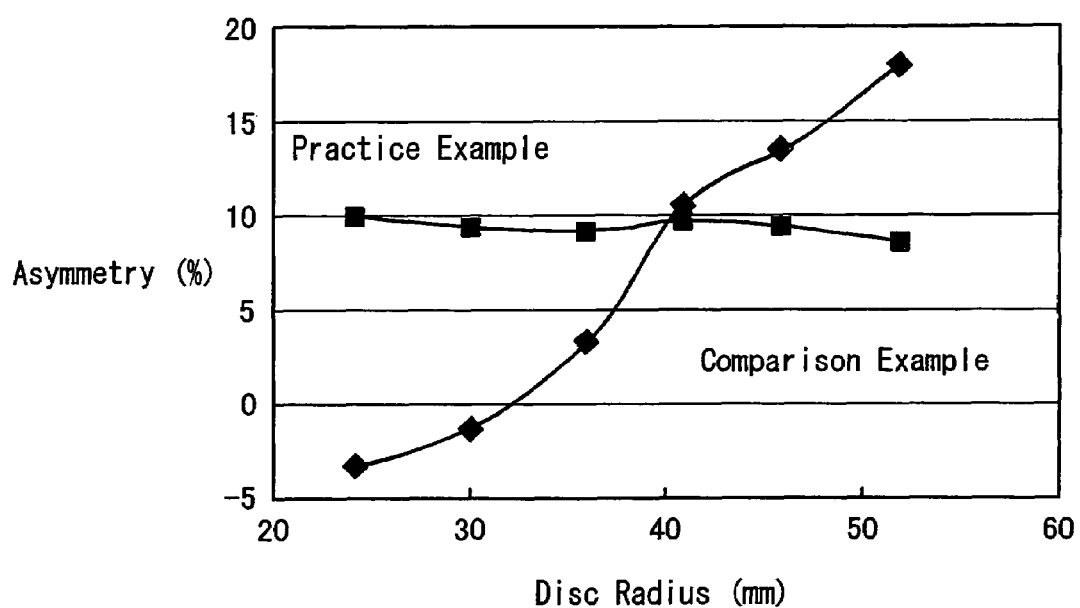
FIG. 9 is a graph showing a result of measuring the asymmetry in a radial direction of an optical disc when the method of the present invention is applied.

As to the optical discs each having a recording capacity of 25 GB obtained in the practice example and comparison example, the asymmetry was measured around the whole optical disc. The result is shown in FIG. 9.

The optical disc of the practice example had the stable asymmetry of approximately the target value (+9.5%) over the whole length in a radial direction of the optical disc to be confirmed that it was an acceptable product having an excellent signal quality deciding from DVD-ROM standard. In contrast, the optical disc of the comparison example had the asymmetry which greatly increased from the inside diameter toward the outside diameter and had NG signal quality in its inner circumference and its outer circumference deciding from DVD-ROM standard.

This is because, although the recording sensitivity of the resist substrate changes inevitably due to a change in film thickness of the resist layer or the like, the conventional method of controlling exposure cannot correct the exposed result, that is, the change in recording sensitivity depending on dimensional accuracy of concave portions, with the result that the change appears as it is without being corrected. In contrast, according to the present invention it is shown that fluctuations of exposed result due to the change in recording sensitivity can be corrected appropriately.

It should be noted that although the above description according to the present invention was given chiefly with respect to the recording pit (mark), the present invention is also applicable to a case where an optical disc having a groove for tracking, addressing or the like is manufactured.

Further, when applying the laser beam for estimation to the exposed master for example, the laser beam can be stabilized by superimposing a high-frequency wave on the laser beam source, for example, a semiconductor laser.

Moreover, when performing the pattern exposure by applying the laser beam for recording to the resist layer, the pit can be formed in various ways not only by a single pulse beam shown by a curved line "a" in FIGS. 12A to 12C, but also by (n−1) pulses, n/2 pulses, a dumbbell (concave) pattern pulse or the like in recording, for example, nT mark as shown in FIGS. 12A to 12C.

Furthermore, in the above described example the stamper 106 for molding is formed directly from the master 104; however, it is possible to obtain the stamper 106 for molding by making, for example, a plurality of master stampers from the master 104 and making a mother stamper by transferring the master stamper. The reason why a plurality of master stampers can be obtained from a single master 104 is that, according to the present invention, the information concave and convex pattern of the master is formed of a strong inorganic resist.

In addition, as to the semiconductor laser outputting the laser beam for recording and laser beam for estimation used to practice the above-described manufacturing method of the present invention, it is preferable to stabilize the laser beam output by keeping the temperature of the semiconductor laser constant by controlling the temperature using, for example, the Peltier element or the like.

INDUSTRIAL APPLICABILITY

According to the exposure-controlling method of the present invention, based on the test exposure before exposing step or the recorded signal characteristics (ratio between reflected light amounts, asymmetry of the reproduced signal with respect to a signal recorded on the exposed master) of the exposed portion right after the exposure, it is possible to decide the quality of final products under the exposing condition the stage of exposing step, which makes it possible to determine or correct the recording power of exposing device with respect to the next area to be exposed immediately from the decided result. Moreover, by adjusting the recording power of the beam for recording so as to make the ratio between reflected light amounts constant, it is possible to make the asymmetry of the recorded signal of finally obtained optical disc constant over the whole disc.

The method of estimating exposure according to the present invention enables the asymmetry of the recorded signal of finally obtained optical disc to be estimated from the exposed master and the signal quality to be decided in the stage of exposing step.

| DESCRIPTION OF REFERENCE NUMERALS | |
|---|---|
| 11 | BEAM SOURCE |
| 12 | COLLIMATOR LENS |
| 13 | BEAM SPLITTER |
| 14 | OBJECTIVE LENS |
| 15 | RESIST SUBSTRATE |
| 16 | TURNTABLE |
| 17 | CONDENSER LENS |
| 18 | DIVIDED PHOTODETECTOR |
| 19 | GRATING |
| 90, 100 | SUBSTRATE |
| 91, 101 | RESIST LAYER |
| 92, 102 | RESIST SUBSTRATE |
| 93, 103 | EXPOSED MASTER |
| 94, 104 | MASTER |
| 95, 105 | PLATED LAYER |
| 96, 106 | STAMPER FOR MOLDING |
| 97, 107 | OPTICAL DISC SUBSTRATE |
| 98, 108 | REFLECTIVE FILM |
| 110 | INTERMEDIATE LAYER |
| 200, 300 | OPTICAL DISC |

The invention claimed is:

1. A method of making a master for manufacturing an optical disc comprising:
   an exposing step of applying a laser beam for recording, modulated by an information signal corresponding to an information signal of an information concave and convex pattern to be formed on said optical disc, to an inorganic resist layer of said master formed on a substrate to form an exposed pattern corresponding to said information concave and convex pattern of said optical disc, and
   after the preceding step a developing step of performing development processing on said inorganic resist layer to form a concave and convex pattern corresponding to said information concave and convex pattern of said inorganic resist layer, wherein
   in said exposing step, a laser beam for estimation is applied to a predetermined area on said inorganic resist layer to estimate information signal characteristics of said exposed pattern of said inorganic resist layer using reflected light of the laser beam for estimation, and power of said laser beam for recording is controlled based on the estimated result,
   wherein said laser beam for estimation is applied to an unexposed area and an exposed area corresponding to where said laser beam for recording formed a portion of the pattern corresponding to said information concave and convex pattern of said optical disc, and the information signal characteristics of said exposed pattern of said inorganic resist layer are estimated to derive the estimated result using a ratio between reflected light amount from said unexposed area and reflected light amount from said exposed area, with said laser beam for estimation.

2. A method of making a master for manufacturing an optical disc according to claim 1, wherein said inorganic resist layer is a resist layer containing an incomplete oxide of transition metals.

3. A method of making a master for manufacturing an optical disc according to claim 1, wherein the predetermined area irradiated with said laser beam for estimation is an area other than the area irradiated with the laser beam for recording on the inorganic resist layer.

4. A method of making a master for manufacturing an optical disc according to claim 1, wherein while said laser beam for recording is being applied, said laser beam for estimation is applied to the proximity of the position irradiated with said laser beam for recording.

5. A method of making a master for manufacturing an optical disc according to claim 1, wherein power of said laser beam for recording is controlled so that said ratio between reflected light amounts is constant.

6. A method of manufacturing an optical disc comprising the steps of: making a master for manufacturing the optical disc, making a stamper for manufacturing said optical disc from said master by transfer, manufacturing an optical disc substrate by transfer using said stamper, depositing a reflective film on the optical disc substrate, and depositing a protective film, wherein
   the step of making said master includes: an exposing step of applying a laser beam for recording, modulated by an information signal corresponding to an information signal of an information concave and convex pattern to be formed on said optical disc, to an inorganic resist layer of said master formed on the substrate to form an exposed pattern corresponding to the information concave and convex pattern of said optical disc, and after the preceding process, a step of performing development processing to said inorganic resist layer to form a concave and convex pattern corresponding to said information concave and convex pattern of said inorganic resist layer; and in said exposing step, a laser beam for estimation is applied to a predetermined area on said inorganic resist layer to estimate information signal characteristics of said exposed pattern by said inorganic resist layer from reflected light of the laser beam for estimation, and based on the estimated result, power of said laser beam for recording is controlled,
   wherein said laser beam for estimation is applied to an unexposed area and an exposed area corresponding to where said laser beam for recording formed a portion of the pattern corresponding to said information concave and convex pattern of said optical disc, and the information signal characteristics of said exposed pattern of said inorganic resist layer are estimated to derive the estimated result using a ratio between reflected light amount from said unexposed area and reflected light amount from said exposed area, with said laser beam for estimation.

7. A method of manufacturing an optical disc according to claim 6, wherein said inorganic resist layer is a resist layer containing an incomplete oxide of transition metals.

* * * * *